United States Patent
Michiels et al.

(10) Patent No.: US 9,665,699 B2
(45) Date of Patent: May 30, 2017

(54) IMPLEMENTING PADDING IN A WHITE-BOX IMPLEMENTATION

(71) Applicants: Wil Michiels, Eindhoven (NL); Jan Hoogerbrugge, Eindhoven (NL); Joachim Trescher, Leuven (BE)

(72) Inventors: Wil Michiels, Eindhoven (NL); Jan Hoogerbrugge, Eindhoven (NL); Joachim Trescher, Leuven (BE)

(73) Assignee: NXP B.V., Austin, TX (US)

( * ) Notice: Subject to any disclaimer, the term of this patent is extended or adjusted under 35 U.S.C. 154(b) by 99 days.

(21) Appl. No.: 14/657,395

(22) Filed: Mar. 13, 2015

(65) Prior Publication Data
US 2016/0267258 A1 Sep. 15, 2016

(51) Int. Cl.
*G06F 21/14* (2013.01)
*H04L 9/06* (2006.01)
*G06F 21/72* (2013.01)

(52) U.S. Cl.
CPC .............. *G06F 21/14* (2013.01); *G06F 21/72* (2013.01); *H04L 9/0631* (2013.01); *G06F 2221/0748* (2013.01); *H04L 2209/16* (2013.01)

(58) Field of Classification Search
None
See application file for complete search history.

(56) References Cited

U.S. PATENT DOCUMENTS

| | | | |
|---|---|---|---|
| 2004/0139340 A1* | 7/2004 | Johnson | G06F 21/14 713/194 |
| 2007/0014394 A1 | 1/2007 | Harder et al. | |
| 2007/0126612 A1* | 6/2007 | Miller | H04L 1/0083 341/67 |
| 2007/0143407 A1* | 6/2007 | Avritch | G06Q 10/107 709/206 |
| 2009/0300328 A1* | 12/2009 | Raju | H04W 28/065 712/204 |
| 2010/0027783 A1* | 2/2010 | Yup | H04L 9/0631 380/44 |
| 2010/0080395 A1* | 4/2010 | Michiels | H04L 9/002 380/278 |
| 2010/0106920 A1* | 4/2010 | Anckaert | G06F 21/79 711/154 |
| 2011/0116625 A1* | 5/2011 | Michiels | G06F 21/14 380/28 |
| 2012/0002807 A1* | 1/2012 | Michiels | H04L 9/002 380/28 |
| 2012/0045050 A1* | 2/2012 | Farrugia | H04L 9/0631 380/28 |

(Continued)

FOREIGN PATENT DOCUMENTS

WO    2010102960 A1    9/2010

OTHER PUBLICATIONS

Brecht Wyseur: "White-Box Cryptography: Hiding Keys in Software",Nagra Kudelski Group, Switzerland. Feb. 15, 2012. pp. 1-9.*

(Continued)

*Primary Examiner* — Farid Homayounmehr
*Assistant Examiner* — Olanrewaju Bucknor

(57) ABSTRACT

A non-transitory machine-readable storage medium encoded with instructions for execution by a keyed encryption operation by a cryptographic system mapping an input message having an encoded portion and a padding portion to an output message, including: instructions for receiving a padding value k; instructions for receiving the input message, wherein the padding portion has a size indicated by the padding value k; instructions for computing a first portion of the encryption operation to produce a first portion output; instructions for computing a compensation factor corresponding to the padding portion of the input message; and instructions for compensating the first portion output based upon the compensation factor.

12 Claims, 6 Drawing Sheets

WHITE-BOX IMPLEMENTATION

FUNCTIONS $f_i$, $g_i$, FIXED

(56) References Cited

U.S. PATENT DOCUMENTS

| | | | |
|---|---|---|---|
| 2012/0093313 A1* | 4/2012 | Michiels | H04L 9/002 380/255 |
| 2012/0121083 A1 | 5/2012 | You et al. | |
| 2012/0155638 A1* | 6/2012 | Farrugia | H04L 9/0631 380/45 |
| 2012/0159186 A1* | 6/2012 | Farrugia | H04L 9/002 713/189 |
| 2014/0019771 A1* | 1/2014 | Emmett | H04L 9/002 713/189 |
| 2014/0258720 A1* | 9/2014 | Black | G06F 21/52 713/165 |
| 2014/0281481 A1* | 9/2014 | Moroney | H04L 63/0457 713/151 |
| 2016/0080143 A1* | 3/2016 | Kindarji | H04L 9/0637 380/28 |

OTHER PUBLICATIONS

Billet, et al., "Cryptanalysis of a White Box AES Implementation", Selected Areas in Cryptography, vol. 3357 of Lecture Notes in Computer Science 227-240.

Cappaert, et al., "An Overview of Control Flow Graph Flattening", K.U. Leuven/ESAT/SCD-COSIC re-trust.dit.unitn.it/files/20081015Doc/session/2-1Cappaert.pdf.

Chow, et al., "A White-Box DES Implementation for DRM Applications", Digital Rights Management: ACM CCS-9 Workshop, DRM 2002, Washington, D.C. USA, Nov. 18, 2002, 1-16.

Chow, et al., "White-Box Cryptography and an AES Implementation", Cryptography: 9th Annual International Workshop, SAC 2002, St. John's, Newfoundland, Canada, Aug. 15, 2002.

Harder, "Syncrosoft Mcfact—Secure Data Processing Technology", Re-trust Sixth Quarterly Meeting, Mar. 11, 2008, Villach, Austria.

Laszlo, et al., "Obfuscating C++ Programs via Control Flow Flattening", Annales Uni. Sci. Budapest, Sect. Comp. 30 (2009), 3-19.

Extended European Search Report for Patent Appln. No. 16154451.5 (Jul. 27, 2016).

Marton, K. et al., "Randomness in Digital Cryptography: A Survey", Romanian Journal of Information Science and Technology Volume, Jan. 1, 2010 (Jan. 1, 2010), pp. 219-240, XP055289898, Retrieved from the Internet: URL:http://www.imt.ro/romjist/Volum13/Number13_3/pdf/KMarton.pdf.

Chow S et al: "Selected Areas in Cryptography, White-Box Cryptography and an AES Implementation", Selected Areas in Cryptography: 9th Annual International Workshop; Revised Papers I SAC 2002, St. John's, Newfoundland, Canada, Aug. 15-16, 2002; [Lecture Notes in Omputer Science ; 2595], Springer Verlag, Berlin (DE), vol. 2595, Aug. 15, 2002 (Aug. 15, 2002), pp. 250-270, XP002587883, ISBN: 978-3-540-00622-0.

* cited by examiner

WHITE-BOX IMPLEMENTATION

FUNCTIONS $f_i$, $g_i$, FIXED

IMPLEMENTING PADDING IN A WHITE-BOX IMPLEMENTATION

TECHNICAL FIELD

Various exemplary embodiments disclosed herein relate generally to securing software components that perform a cryptographic function against attacks including implementing padding in a white-box implementation.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a non-transitory machine-readable storage medium encoded with instructions for execution by a keyed encryption operation by a cryptographic system mapping an input message having an encoded portion and a padding portion to an output message, including: instructions for receiving a padding value k; instructions for receiving the input message, wherein the padding portion has a size indicated by the padding value k; instructions for computing a first portion of the encryption operation to produce a first portion output; instructions for computing a compensation factor corresponding to the padding portion of the input message; and instructions for compensating the first portion output based upon the compensation factor.

Further various exemplary embodiments relate to a non-transitory machine-readable storage medium encoded with instructions for execution by a keyed encryption operation by a cryptographic system mapping an input message having an encoded portion and a padding portion to an output message, wherein the keyed encryption operation includes at least one round including a non-linear mapping function configured to map input data to output data, including: instructions for receiving a padding value k; instructions for receiving the input message, wherein the input message has N portions, the padding portion has a size indicated by the padding value k, and the padding portion has a random value; instructions for computing an output of the non-linear mapping function for one of the N portions of the input message; instructions for computing a compensation factor for the one portion of the input message, wherein the compensation factor is 0 when the one portion of the input message is part of the encoded portion and wherein the compensation factor is equal to the output of the non-linear mapping function when the one portion of the input message is part of the padding portion; and instructions for compensating the output of the non-linear mapping function based upon the compensation factor.

Further various exemplary embodiments relate to a non-transitory machine-readable storage medium encoded with instructions for execution by a keyed decryption operation by a cryptographic system mapping an encrypted input message having a padding portion to an output message having an encoded portion and a padding portion, including: instructions for computing the decryption operation on the encrypted input message to produce the encoded output portion of the output message; instructions for randomly generating the padding portion of the output message.

Further various exemplary embodiments relate to a non-transitory machine-readable storage medium encoded with instructions for execution by a keyed encryption operation by a cryptographic system mapping an input message having an encoded portion and a padding portion to an output message, wherein the keyed encryption operation includes at least one round including a non-linear mapping function configured to map input data to output data, wherein the input message has N portions, and wherein a state of the keyed decryption operation has N portions, including: instructions for computing an output of the non-linear mapping function for one of the N portions of the state; instructions for computing a compensation factor for the output of the non-linear mapping function, wherein the compensation factor is 0 when the output of the non-linear mapping function is part of the encoded portion and wherein the compensation factor is equal to the output of the non-linear mapping function when the output of the non-linear mapping function is part of the padding portion; and instructions for compensating the output of the non-linear mapping function based upon the compensation factor.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
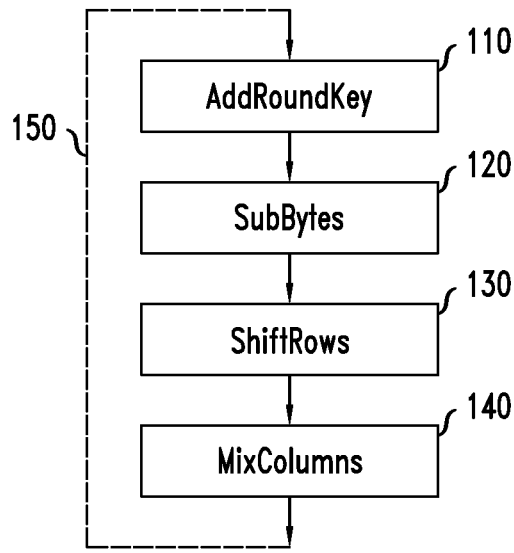
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well.

The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACS. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks.

A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depend on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in GF($2^8$).

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and Mix-Columns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
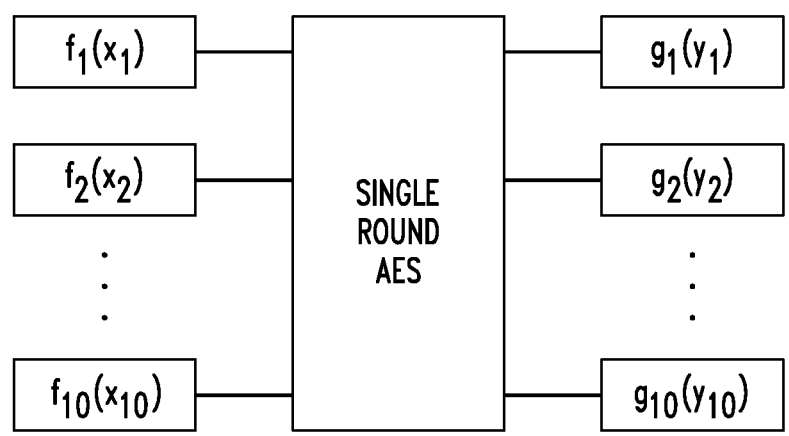
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function for input byte $x_{i,j}$ as $T_{i,j}(x_{i,j})=S(x_{i,j} \oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing Ti,j or implemented as a separate manipulation of the state matrix. In the MixColumns step, an output byte $z_{i,j}$ of the round is computed from the 4 output bytes $y_{1,j}, y_{2,j}, y_{3,j}$, and $y_{4,j}$ via the algebraic expression $z_{1,j}=MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in GF($2^8$) for some constants $MC_{1,r}$.

Now define a lookup table for each byte-to-byte function $Q_{i,j,l}(x_{i,j})=MC_{l,i} \cdot T_{i,j}(x_{i,j})$ with i,j,l=1, 2, . . . , 16. Then any output byte $z_{l,j}$ may be computed by XORing the results of these lookup tables, i.e., $z_{l,j}=Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
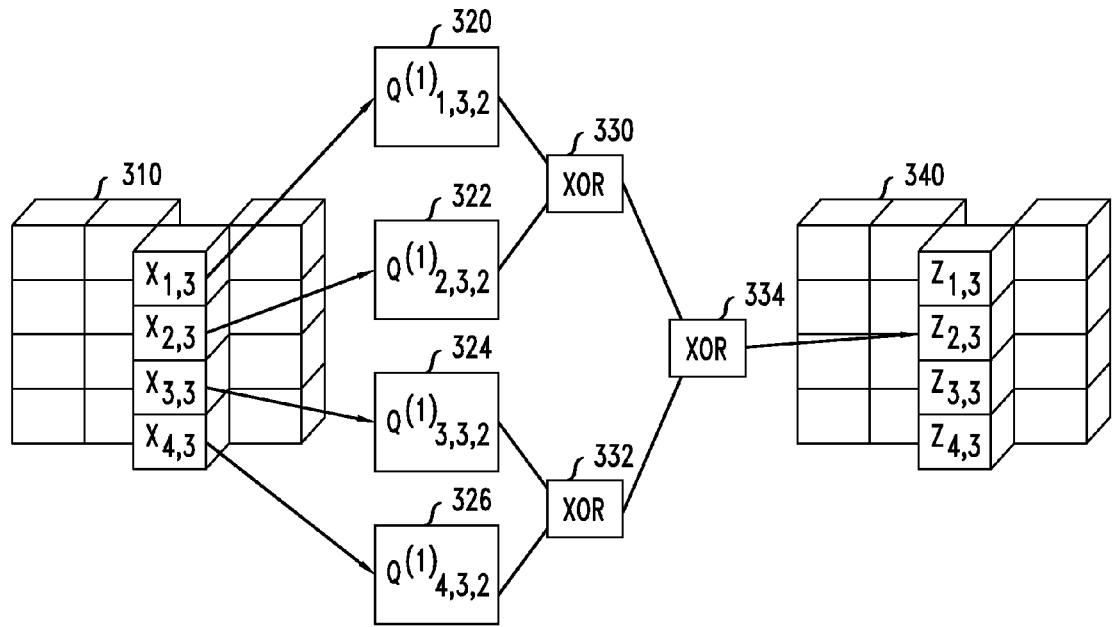
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}$, $x_{2,3}$, $x_{3,3}$, and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
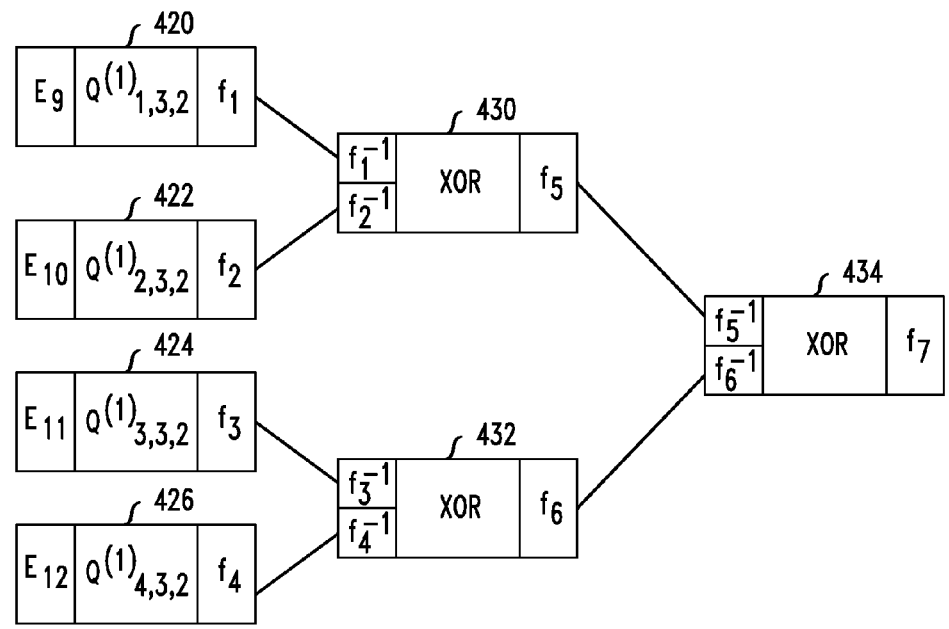
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

FIG. 4 illustrates a portion of the network table of FIG. 3 obfuscated by encoding the inputs and outputs. The lookup tables 420, 422, 424, 426 correspond to lookup tables 320, 322, 324, 326 of FIG. 3. The inputs of lookup tables 420, 422, 424, 426 are encoded by functions $E_9$, $E_{10}$, $E_{11}$, $E_{12}$, respectively. The outputs of lookup tables 420, 422, 424, 426 are encoded by functions $f_1$, $f_2$, $f_3$, $f_4$ respectively. XOR 430 corresponds to XOR 330. The inputs of XOR 430 decode input using $f_1^{-1}$ and $f_2^{-1}$. The output of XOR 430 is then encoded by function $f_5$. In a similar manner XORs 432, 434 have input decodings and output encodings as illustrated. The output $z_{2,3}$ is encoded using $f_7$.

Besides hiding the key, a white-box implementation can be used to realize several interesting goals. For instance, as indicated by Chow et al., they can be used to hook a cryptographic functionality to the surrounding program. Further, U.S. patent application Ser. No. 14/220,321 entitled "SECURITY MODULE FOR SECURE FUNCTION EXECUTING ON UNTRUSTED PLATFORM" filed Mar. 20, 2014 describes how a white-box implementation may be used to put an internal encoding on data in a secure way. Both of these applications are based on adding an external encoding to the white-box implementation. That is, instead of having a white-box implementation with an input and output of plaintext and cipher text associated with the implemented cipher, the input and/or output is encoded by some secret function.

A problem arises when the plaintext is not an even multiple of the block size of the cryptographic function, in which case padding is needed. Note that the plaintext is the input in case of encryption and the output in case of decryption. This padding presents the following problem. The padding pattern is typically simple (e.g., some specific byte followed by zero-bytes) and should be assumed to be known by an attacker.

Suppose that it is desired to apply an white-box AES implementation designed for 16-byte data blocks to a 10-byte data block $x=x_1, x_2, \ldots, x_{10}$. Then, the input will be padded with 6 bytes $p=p_1, p_2, \ldots, p_6$. Furthermore, let E denote the external encoding function for the white-box implementation. Then, E(x, p) is computed out of an encoded version e(x) of x and p. Here it is assumed that p is not encoded because it is assumed to be known to an attacker. Suppose that there is a program P for doing this. Then, the input-output behavior of the program can be analyzed for different padding lengths. This is vulnerable to information leakage on E. This may be illustrated by means of an example.

Let the padding be given by all zeroes, i.e., $p_i=0$ for all i. Furthermore, let e and E be byte-wise encoding, where a function F is called byte-wise if for input bytes $b_1 b_2, \ldots, b_n$ and bijective functions $f_1, f_2, \ldots, f_n$ we have $F(b_1 b_2, \ldots, b_n)=(f_1(b_1), f_2(b_2), \ldots, f_n(b_n))$. Then, observing the input-output of P gives us $f_i(0)$. Hence, if $f_i$ is an affine 8-bit function, we lose 8-bits of security (out of the approximately 70).

A solution to this problem is described as follows. For encryption, a white-box implementation is provided with an extra input representing the size of the plaintext. The padding is then not incorporated in the encoded input of the white-box implementation. Instead, the extra input parameter causes the white-box implementation to behave in accordance with the padding scheme. For decryption, there is the choice between having the size of the plaintext as extra input parameter or letting the white-box implementation compute the size of the plaintext. The output bytes that correspond to padding bytes may then be filled in arbitrarily by the white-box implementation.

The solution described above may be applied to obtain a table-based white-box AES implementation that may be used in combination with padding. A simplified version of the white-box AES implementation of Chow et al. was described above and will be used to describe embodiments below to implement the padding solution.

As already indicated described above, external encodings in a white-box implementation can be used to hook a cryptographic functionality to the surrounding program or to securely put internal encodings on data in the software architecture. The above-presented white-box implementation has such external encodings. Now suppose that the white-box implementation is to be used in an application where plaintext inputs to AES may be smaller than the 16-byte block size and where such inputs are to be padded with one or more 0-bytes.

For an input of m<16 bytes, this may be realized by deriving $(E_1(x_1), E_2(x_2), \ldots, E_k(x_k), E_{k+1}(0), \ldots, E_{16}(0))$, where the functions $E_i$ denote the external byte encoding. However, this leaks information about $E_i$ for i>k. Now a white-box implementation will be described where the white-box implementation is supplied with input parameter k and to handle the padding internally.

The white-box implementation receives an input k and an encoded input $(E_1(x_1), E_2(x), \ldots, E_k(x_k), v_{k+1}, \ldots, v_{16})$, where $x_1, \ldots, x_k$ is the input data and $v_{k+1}, \ldots, v_{16}$ are some arbitrary bytes. This results in the white-box implementation making an error as the value $v_i$ should be $E_i(0)$. Now it will be illustrated how to compensate for this in the computation of the first nibble of $z_{2,3}$. Then by doing this compensation for all output nibbles of the first round, an embodiment is described that accounts for the padding of the input data. Now a modified computation of the first nibble of $z_{2,3}$ will be shown by extending the table network of FIG. 3. The actual white-box implementation for the first nibble of $z_{2,3}$ is next obtained by applying obfuscations in the same way as was described to obtain the network of FIG. 4.

Figure 5:
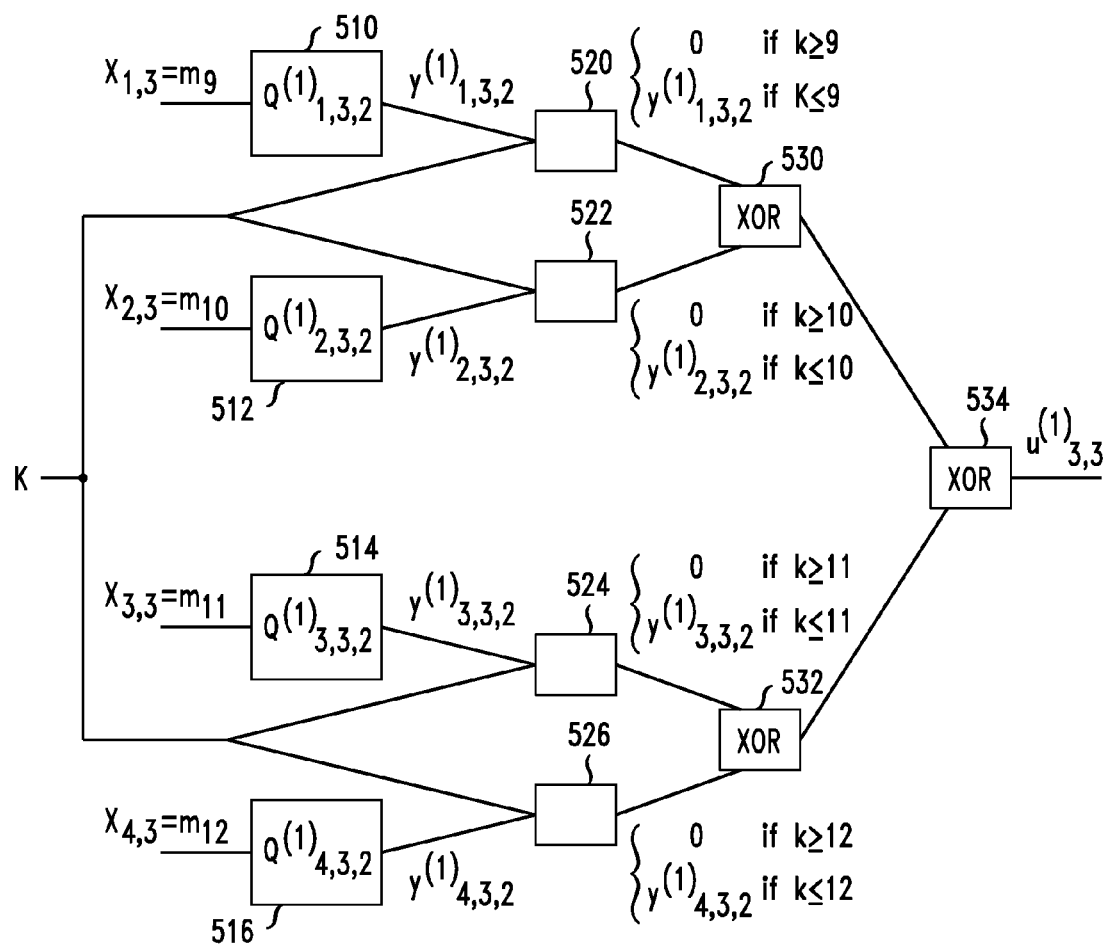
FIG. 5 illustrates a table network for computing a compensation factor $u_{2,3}$.

Let the error made for the first nibble of $z_{2,3}$ be denoted by $u_{2,3}$. Then, the error due to in input $v_i$ may be compensated for by XORing the computed value $z_{2,3}$ with $u_{2,3}$. FIG. 5 illustrates a table network for computing a compensation factor $u_{2,3}$. Q-boxes 510, 512, 514, 516 receive input bytes $x_{1,3}, x_{2,3}, x_{3,3}$, and $x_{4,3}$ respectively. After each Q-box 510, 512, 514, 516, which computes $y_{i,j,l}$ from $x_{i,j}$, padding tables 520, 522, 524, 526 are introduced that have as inputs the parameter k and the output $y_{i,j,l}$ of the respective Q-boxes 510, 512, 514, 516. Note that because the number of padding bytes ranges from 0 to 15 (16 padding bytes does not make much sense), both inputs are nibbles. The padding tables 520, 522, 524, 526 return 0 if $x_{i,j}$ is a proper input byte, and the padding tables 520, 522, 524, 526 return $y_{i,j,l}$ if $x_{i,j}$ should be a padding byte 0 when it is instead a randomly selected byte v. The randomness of the selected byte v may be truly random or pseudorandom, and both are contemplated when any value is described as being random. Hence, a table network for computing the first nibble output byte (2,3) for the first round according to this embodiment is obtained by the output $z_{2,3}$ of the network of FIG. 3, the output $u_{2,3}$ of the network of FIG. 5, and a XOR table for XORing $z_{2,3}$ and $u_{2,3}$. As stated before, a white-box implementation may now be obtained by applying the obfuscation techniques used in FIG. 4.

FIGS. 3 and 4 illustrate a basic white-box AES implementation for encryption. For decryption, a similar table network may be derived where only the content of the Q-boxes changes. So, FIG. 3 is again taken as a starting point.

For decryption, the encoded output $(\hat{E}_1(x_1), \hat{E}_2(x), \ldots, \hat{E}_k(x_k), \hat{E}_{k+1}(0), \ldots, \hat{E}_{16}(0))$ is to be computed, where the functions $\hat{E}_i$ denote the external byte encoding. Analogously to the encryption case, $E(x)=(E_1(x_1), E_2(x), \ldots, E_k(x_k), v_{k+1}, \ldots, v_{16})$ is computed instead in order to prevent information leakage on the external byte encoding. Here, $v_{k+1}, \ldots, v_{16}$ are again some arbitrary bytes. In order for the surrounding program to know how to handle the random bytes, i.e., to know that they should in fact have the value 0, the surrounding program must in addition to E(x) also know the value k. This leads to two issues. First, the white-box implementation must change padding bytes to arbitrary values. Also, how does the white-box implementation know which bytes are padding bytes? Second, how does the software using the output of the white-box implementation know the value k?

One way of handling the first issue is by letting the parameter k be an input parameter to the white-box implementation. Then an embodiment may be constructed as follows. Because the last round does not contain a MixColumns operation, the input bytes of the last round have a bijective relation to the output of the complete decryption algorithm. Hence, the padding bytes may be changed to arbitrary values by changing the corresponding output bytes of the second to last round to arbitrary values $v_{i,j}$. This can, for instance, be done by extending the table network of FIG. 3 to the network of FIG. 6.

One way of handling the second issue is by communicating the padding length value k to the surrounding software.

Figure 6:
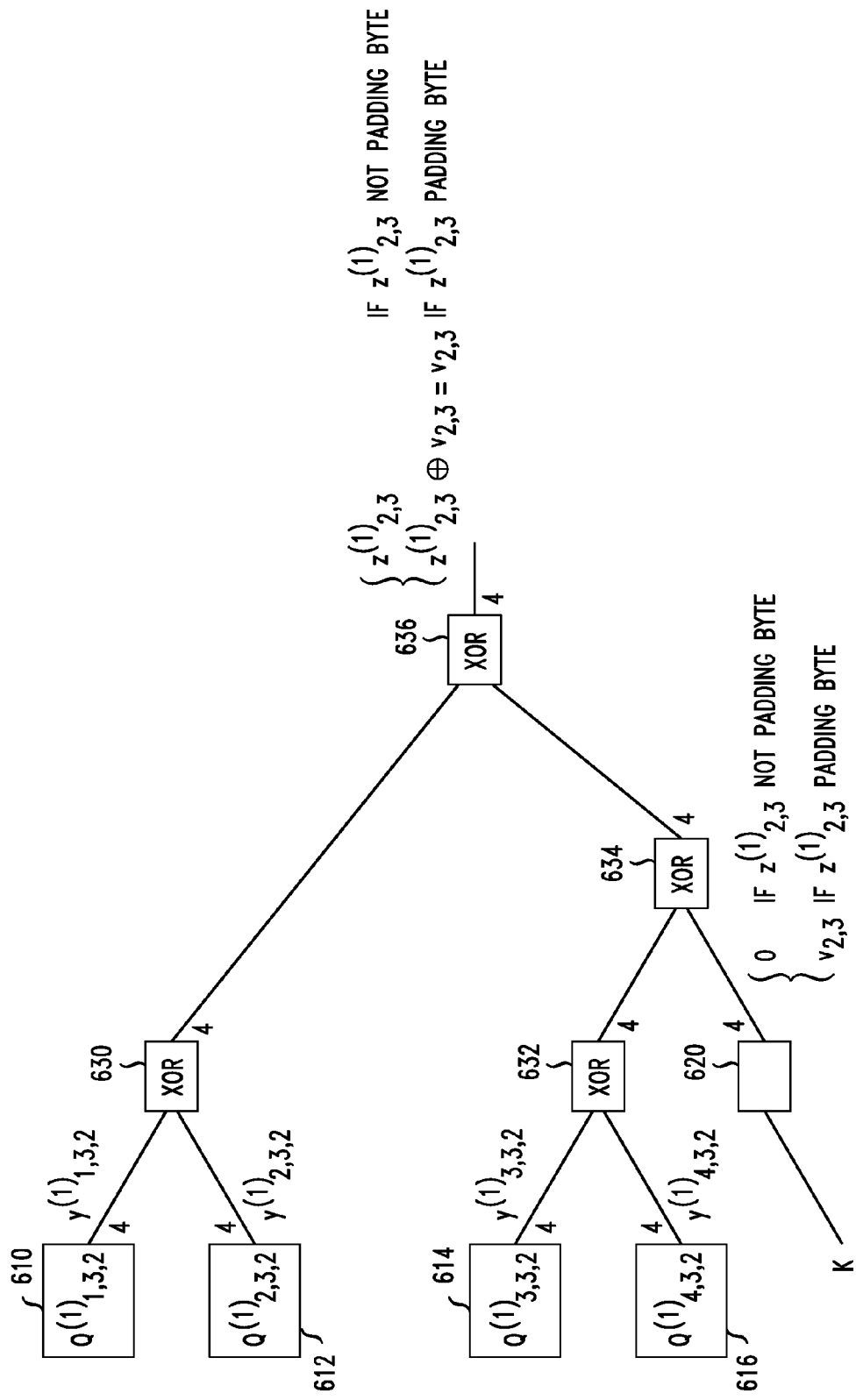
FIG. 6 illustrates a table network for a white-box implementation of a decryption function that compensates for padding.

FIG. 6 illustrates a table network for a white-box implementation of a decryption function that compensates for padding. Q-boxes 610, 612, 614, 616 receive input bytes $x_{1,3}, x_{2,3}, x_{3,3}$, and $x_{4,3}$ respectively to compute $y_{i,j,l}$. The XOR 630 XORs the outputs of Q-boxes 610 and 612. The XOR 632 XORs the outputs of Q-boxes 614 and 616. A padding table 620 received k as an input and produces 0 if $z_{2,3}$ is not a padding byte and produces $v_{2,3}$ if $z_{2,3}$ is a padding byte. The XOR 634 XORs the output of the padding table 620 and the XOR 632. The XOR 636 XORs the output of the XOR 630 and the XOR 634. The XOR 636 produces $z_{2,3}$ if $z_{2,3}$ is not a padding byte and produces $v_{2,3}$ if $z_{2,3}$ is a padding byte.

An alternative approach for the above-mentioned first issue is to compute the value k in the white-box implementation. How this can be done will now be described. Consider the network of FIG. 3 for the second to last round. Hence, the x-values denote the input to the second to last round and the z-values the output of this round. This means that the z-values are the input to the last round. The last round only includes a Q-box layer, i.e., a byte-wise non-linear operation, and an inverse ShiftRows operation. For ease of presentation, the inverse ShiftRows operation is omitted in the last round (which only corresponds to a renumbering of the bytes), and it is assumed that the Q-boxes of the last round map the 0-padding bytes to 0. This means that checking whether the last output-byte of the cipher is 0 corresponds to checking whether the last output byte of the second last round equals 0.

Figure 7:
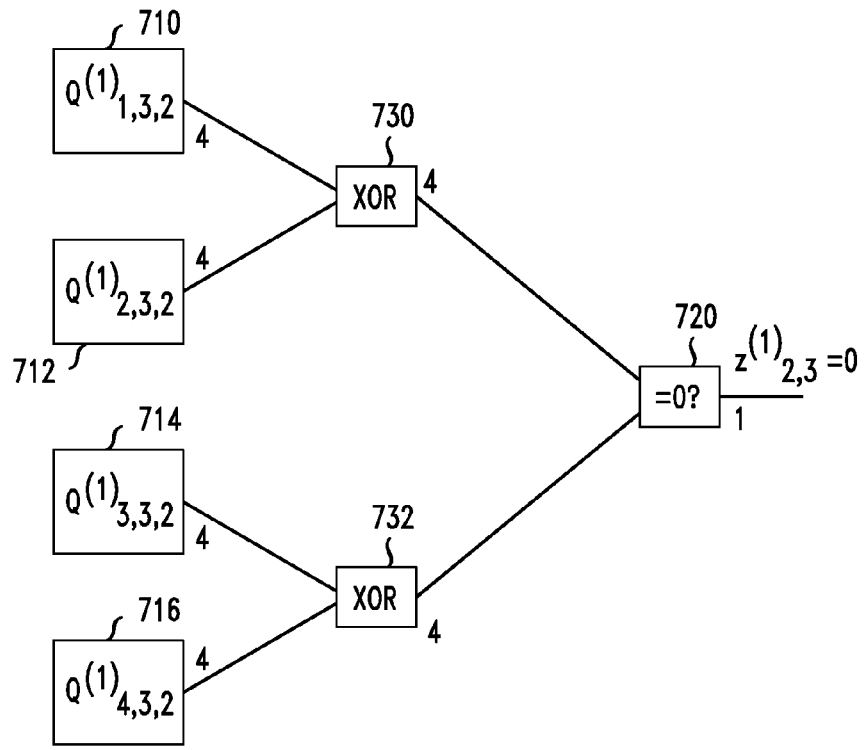
FIG. 7 illustrates a table network of a white-box implementation of the second to last round for the first nibble of $z_{2,3}$.

FIG. 7 illustrates a table network of a white-box implementation of the second to last round for the first nibble of $z_{2,3}$. The network computes whether the nibble is 0. The XOR 730 XORs the outputs of Q-boxes 710 and 712. The XOR 732 XORs the outputpus of Q-boxes 714 and 716. The zero detection table 720 receives the outputs of the XORs 730 and 732 and determines if the output of the first nibble of $z_{2,3}$ is 0.

Figure 8:
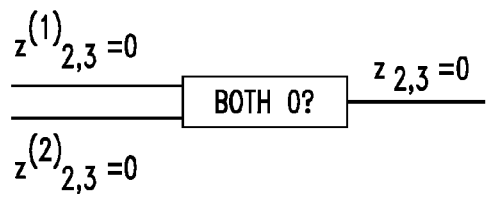
FIG. 8 illustrates a lookup table that determines if the two nibbles of $z_{2,3}$ are 0.
Figure 9:
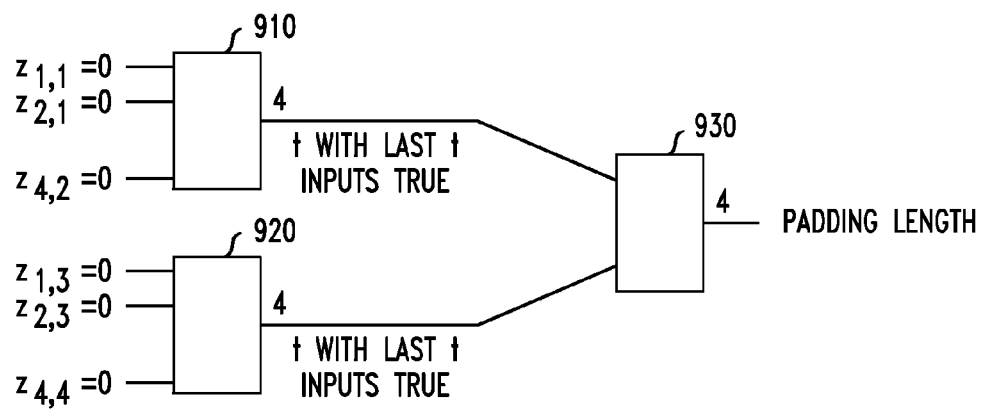
FIG. 9 illustrates a lookup table network for determining the number of padding bytes in the outputs $z_{i,j}$.

FIG. 8 illustrates a lookup table that determines if the two nibbles of $z_{2,3}$ are 0. FIG. 9 illustrates a lookup table network for determining the number of padding bytes in the outputs $z_{i,j}$. Knowing for all 16 output bytes whether or not they are 0, the padding length may be computed. First, the lookup table 910 computes with how many 0's are in the first 8 output bytes, and the lookup table 920 computes how many 0's are in the last 8 output bytes. From these numbers, the lookup table 930 computes the padding length k. Note that if the last bytes of the plaintext are 0, then this can be because they are padding bytes or because these plaintext bytes happen to be 0. This distinction is not made by this embodiment. If output bytes end with zeroes, then this is interpreted as padding bytes.

Having the padding length k, this value may now be used in the computation of the output values $z_{i,j}$ of the second to last round so that if the byte corresponds to the padding, then it is set to some arbitrary value v. This can be done in the same way as described above for the case where k is input parameter of the white-box implementation. The total table network is again obfuscated in the way presented in FIG. 3.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 10:
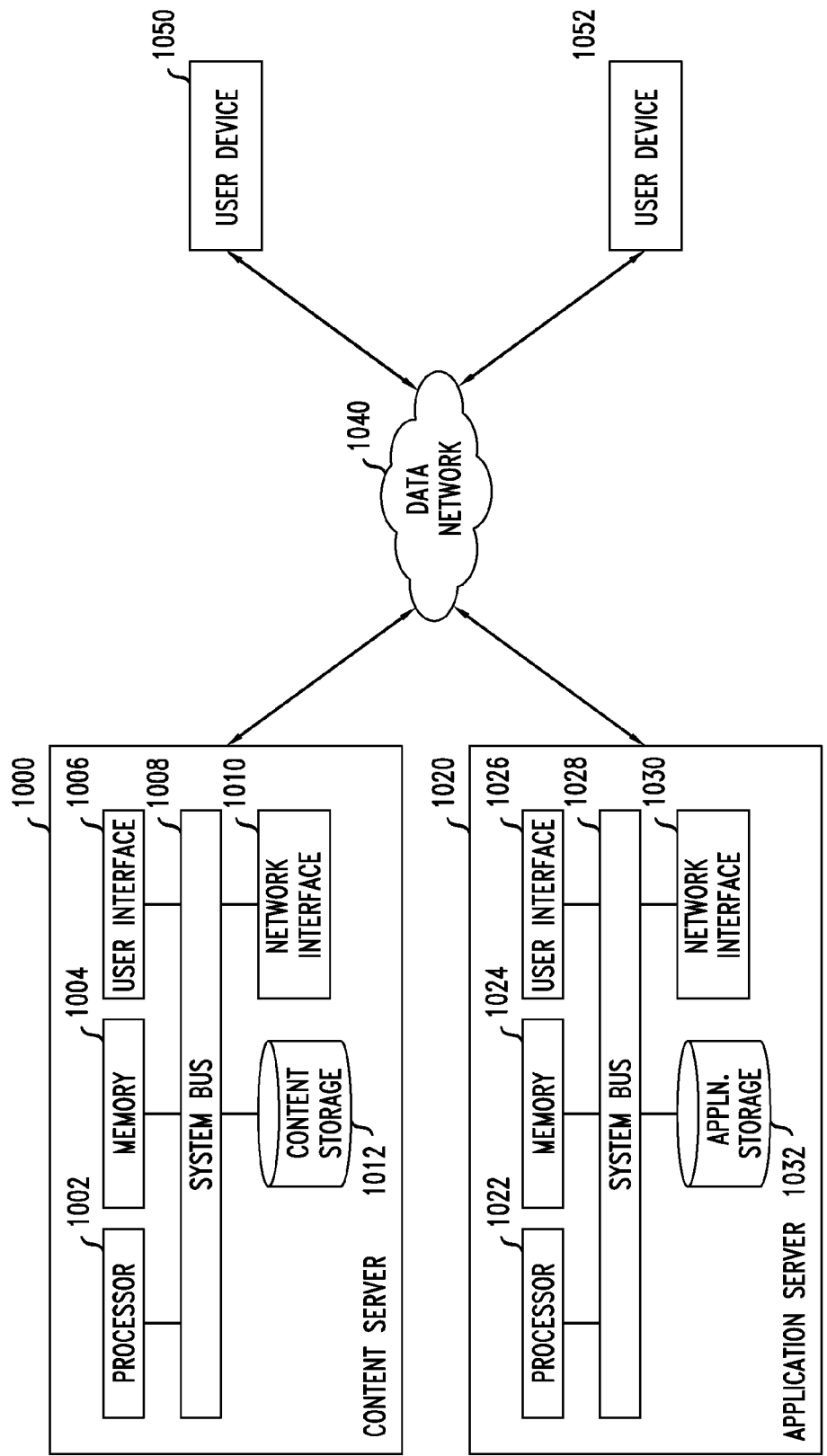
FIG. 10 illustrates a system for providing a user device secure content and a software application that processes the secure content.

FIG. 10 illustrates a system for providing a user device secure content and a software application that processes the secure content. The system includes a content server 1000, application server 1080, user devices 1050, 1052, and a data network 1040. The user devices 1050, 1052 may request access to secure content provided by the content server 1000 via data network 1040. The data network can be any data network providing connectivity between the user devices 1050, 1052 and the content server 1000 and application server 1080. The user devices 1050, 1052 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 1000. The software application may be downloaded from the application server 1080. The software application may be obscured using the techniques described above as well as operate as described above. Once the user devices 1050, 1052 install the software application, the user device may then download secure content from the content server 1000 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 1000 may control the access to the secure content provided to the user devices 1050, 1052. As a result when the content server 1000 receives a request for secure content, the content server 1000 may transmit the secure content to the requesting user device. Likewise, the application server 1020 may control access to the software application provided to the user devices 1050, 1052. As a result when the content server 1020 receives a request for the software application, the application server 1020 may transmit the software application to the requesting user device. A user device requesting the software application or secure content may also be authenticated by the respective servers, before providing the software application or secure content to the user device.

The content server 1000 may include a processor 1002, memory 1004, user interface 1006, network interface 1010, and content storage 1012 interconnected via one or more system buses 1080. It will be understood that FIG. 10 constitutes, in some respects, an abstraction and that the actual organization of the components of the device 1000 may be more complex than illustrated.

The processor 1002 may be any hardware device capable of executing instructions stored in memory 1004 or storage 1012. As such, the processor may include a microprocessor, field programmable gate array (FPGA), application-specific integrated circuit (ASIC), or other similar devices.

The memory 1004 may include various memories such as, for example L1, L2, or L3 cache or system memory. As such, the memory 1002 may include static random access memory (SRAM), dynamic RAM (DRAM), flash memory, read only memory (ROM), or other similar memory devices.

The user interface 1006 may include one or more devices for enabling communication with a user such as an administrator. For example, the user interface 1006 may include a display, a mouse, and a keyboard for receiving user commands.

The network interface 1010 may include one or more devices for enabling communication with other hardware devices. For example, the network interface 1010 may include a network interface card (NIC) configured to communicate according to the Ethernet protocol. Additionally, the network interface 1010 may implement a TCP/IP stack for communication according to the TCP/IP protocols. Various alternative or additional hardware or configurations for the network interface 1010 will be apparent.

The content storage 1012 may include one or more machine-readable content storage media such as read-only memory (ROM), random-access memory (RAM), magnetic disk storage media, optical storage media, flash-memory devices, or similar storage media. In various embodiments, the content storage 1012 may store content to be provided to users.

The application server 1020 includes elements like those in the content server 1000 and the description of the like elements in the content server 1000 apply to the application server 1020. Also, the content storage 1012 is replaced by application storage 1032. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a keyed encryption operation by a cryptographic system mapping an input message having an encoded portion and a padding portion to an output message, comprising:
   instructions for receiving a padding value k;
   instructions for receiving the input message, wherein the padding portion has a size indicated by the padding value k and wherein the padding portion has a random value;
   instructions for computing a first portion of the encryption operation on the input message to produce a first portion output;
   instructions for computing a compensation factor based upon the padding portion of the input message including determining whether an input portion of the input message is part of the padding portion and calculating the compensation factor based upon whether the input portion is part of the padding portion; and
   instructions for compensating the first portion output based upon the compensation factor.

2. The non-transitory machine-readable storage medium of claim 1, wherein,
   the encryption operation is an Advanced Encryption Standard (AES) encryption operation, the N portions are 16 bytes, and
   the non-linear mapping functions includes the AES substitution box.

3. The non-transitory machine-readable storage medium of claim 1, wherein lookup tables implement the keyed encryption operation.

4. The non-transitory machine-readable storage medium of claim 1, wherein finite state machines implement keyed encryption operation.

5. A non-transitory machine-readable storage medium encoded with instructions for execution by a keyed encryption operation by a cryptographic system mapping an input message having an encoded portion and a padding portion to an output message, wherein the keyed encryption operation includes at least one round including a non-linear mapping function configured to map input data to output data, comprising:
   instructions for receiving a padding value k;
   instructions for receiving the input message, wherein the input message has N portions, the padding portion has a size indicated by the padding value k, and the padding portion has a random value;
   instructions for computing an output of the non-linear mapping function for one of the N portions of the input message;
   instructions for computing a compensation factor for the one portion of the input message, wherein the compensation factor is 0 when the one portion of the input message is part of the encoded portion and wherein the compensation factor is equal to the output of the non-linear mapping function when the one portion of the input message is part of the padding portion; and
   instructions for compensating the output of the non-linear mapping function based upon the compensation factor.

6. A non-transitory machine-readable storage medium encoded with instructions for execution by a keyed decryption operation by a cryptographic system mapping an encrypted input message having an input padding portion to an output message having an encoded portion and an output padding portion, comprising:
   instructions for receiving a padding value k;
   instructions for receiving the input message, wherein the input padding portion has a size indicated by the padding value k and wherein the input padding portion has a random value;
   instructions for computing the decryption operation on the encrypted input message to produce the encoded output portion of the output message including determining whether an input portion of the input message is part of the input padding portion and calculating the compensation factor based upon whether the input portion is part of the input padding portion; and
   instructions for randomly generating the output padding portion of the output message.

7. The non-transitory machine-readable storage medium of claim 6, further comprising instructions for receiving a padding value k, wherein the input padding portion has a size indicated by the padding value k.

8. The non-transitory machine-readable storage medium of claim 7, further comprising instructions for determining a padding value k based upon the input padding portion of the input message, wherein the input padding portion of the input message has a size indicated by the padding value k.

9. A non-transitory machine-readable storage medium encoded with instructions for execution by a keyed encryption operation by a cryptographic system mapping an input message having an encoded portion and a padding portion to an output message, wherein the keyed encryption operation includes at least one round including a non-linear mapping function configured to map input data to output data, wherein the input message has N portions, and wherein a state of the keyed decryption operation has N portions, comprising:

instructions for computing an output of the non-linear mapping function for one of the N portions of the state;

instructions for computing a compensation factor for the output of the non-linear mapping function, wherein the compensation factor is 0 when the output of the non-linear mapping function is part of the encoded portion and wherein the compensation factor is equal to the output of the non-linear mapping function when the output of the non-linear mapping function is part of the padding portion; and instructions for compensating the output of the non-linear mapping function based upon the compensation factor.

10. The non-transitory machine-readable storage medium of claim 9, wherein, the decryption operation is an Advanced Encryption Standard (AES) encryption operation, the N portions are 16 bytes, and the non-linear mapping functions includes the AES substitution box.

11. The non-transitory machine-readable storage medium of claim 10, wherein lookup tables implement the keyed decryption operation.

12. The non-transitory machine-readable storage medium of claim 10, wherein finite state machines implement keyed decryption operation.

\* \* \* \* \*